United States Patent Office 2,768,563
Patented Oct. 30, 1956

2,768,563

RESIN BONDED CEMENT

Meyer Immerman, Los Angeles, Calif.

No Drawing. Application May 11, 1953,
Serial No. 354,429

2 Claims. (Cl. 94—22)

The present invention relates to the repair of concrete floors by filling cracks or pits therein and to new compositions of matter which are especially suitable for this purpose.

A successful composition for this purpose must possess several attributes:
1. It must bond strongly to concrete.
2. It must be hard, tough, and durable to withstand the great loads and severe shock and frictional forces which concrete surfaces are ordinarily subjected to.
3. It must be resistant to oil and water since such materials are frequently present on concrete surfaces.
4. It should be resistant to the action of acids and alkalies.
5. It should not soften when subjected to elevated temperatures.
6. It should preferably not contain darkly colored ingredients so that it may be applied either uncolored or colored, as desired.
7. It should preferably be quick setting.

In accordance with the present invention, the aforementioned attributes are realized by compositions which broadly include:
1. A powdered inorganic substance that will consolidate when moistened with water such as aluminous cement as exemplified by Portland cement;
2. A suitable filler such as sand;
3. A synthetic thermoplastic film-forming material; and
4. An organic solvent in which the aforementioned ingredients are slurried.

The proportions of the various ingredients may be varied within wide limits. With regard to the proportion of filler to cement 2–4 parts of filler such as sand may be employed for every part of Portland cement. The amount of synthetic thermoplastic film-forming material is likewise variable within wide limits, preferably 1 part of thermoplastic to 3 parts of the cement sand mixture is employed. The least amount of thermoplastic which must be employed is an amount sufficient to bond the cement sand mixture together and the maximum amount of thermoplastic which is usable is determined mainly by practical considerations such as the cost of the plastic and the fact that very large amounts of plastic adversely affect the hardness of the resulting composition. Between 5 and 50% of thermoplastic by weight based on the total weight of the cement, sand, thermoplastic mixture constitutes a suitable range.

With regard to the amount of organic solvent which is to be employed, the only criteria which must be satisfied is that sufficient solvent be employed to produce a workable paste. For example, when 18 parts by weight of a mixture of Portland cement and sand is mixed together with 6 parts by weight of thermoplastic, approximately 6 parts by weight of an organic solvent will produce a workable paste.

The setting time of the composition can be made as rapid as desired by selection of an organic solvent of high volatility, keeping in mind that sufficient time, for example 10 to 30 minutes, must be permitted to enable the ingredients to be mixed and applied. Moreover, the setting time may be adequately adjusted by the selection of a suitable solvent of desired volatility or by employing mixtures of solvents to obtain a mixture possessing the exact volatility desired. When the solvent evaporates, the film-forming thermoplastic material provides a composition which is sufficiently tenacious to be usable (e. g. walked upon), although the full strength and hardness of the cement composition has not as yet been developed. The composition can then be moistened and in its moistened condition will be in a usable form while the cement contained therein is hydrated and set to develop the full strength and hardness of the composition.

Suitable solvents for use in the present invention are illustrated by the following, which are presented in the order of their increasing time to dry, as follows:

1. Acetone
2. Methyl ethyl ketone
3. Benzine
4. Toluene

A mixture of acetone and toluene is preferred. The rate of drying can be controlled by the amount of toluene employed in the mixture and may be varied in accordance with the ambient temperature at the time that the composition of the invention is to be applied. In warm weather, it is desirable to increase the proportion of toluene in the mixture, and in cold weather the reverse would be true.

I have discovered that synthetic thermoplastic film forming materials when employed in the form of coarse particles, i. e., shavings and coarse granules, yield stronger compositions than does the corresponding material in the form of a fine powder. An additional advantage of the utilization of coarse particles is that less solvent is required to obtain mastics of the same consistency. The finer particles are more easily dissolved. Apparently, when the material goes into solution to a large extent, it wets the particles of cement and filler, yielding weak mixes and making the cement particles less subject to hydration and consequently less capable of bonding to themselves and to the filler.

When the synthetic thermoplastic film forming materials are employed in the form of coarse particles, a spot-welded type set is obtained. The resulting composition retains sufficient porosity to permit the subsequent hydration of the cement particles and the consequent realization to the greatest extent of the bonding and hardening characteristics of the cement.

The preferred range of particle size for the synthetic thermoplastic film forming material is from 20 mesh to shavings from ¼ to ½ inch long by ¹⁄₁₆ to ⅛ inch wide by ¹⁄₆₄ inch thick.

Suitable synthetic thermoplastic film-forming materials for use in the present invention are exemplified by methacrylates, polystyrene, polystyrene-butadiene mixtures, polyvinyl compositions such as polyvinyl acetate and polyvinyl chloride-polyvinyl acetate copolymers, thermoplastic derivatives of cellulose such as ethyl cellulose, cellulose acetate and cellulose acetate butyrate.

Among the methacrylates, methyl methacrylate gave the hardest and toughest film. Other methacrylates such as the ethyl, butyl isobutyl etc. were also employed successfully although the resulting hardness of the composition was not quite as advantageous as that obtained using methyl methacrylate. Polystyrene was found to be satisfactory, although it was necessary to allow the mixture to stand longer in order to allow the composition to dry completely. This is particularly so when aromatic and chlorinated hydrocarbons are employed, since polystyrene has a strong affinity for these solvents. Compositions within the range of 5 to 50% by weight are effective and the resulting composition is very resistant to acids and alkalies. The inclusion of butadiene in the polystyrene also produces satisfactory results. The properties of the resulting composition being directly related to the ratio of styrene to butadiene in the copolymer; the more styrene present, the tougher and harder the plastic.

Among the polyvinyl thermoplastics, polyvinyl acetate was found to give very hard cement compositions. The effective range was from 5–50% by weight although the hardness fell off when amounts in excess of 10% were employed. Ketones such as acetone, chlorinated hydrocarbons such as carbon tetra chloride, esters such as ethyl acetate, ethers, alcohols such as isopropyl alcohol and aromatic hydrocarbons such as toluene were all usable as solvent carriers. The resulting cement composition was resistant to mild acids and alkalies.

Copolymers of vinyl chloride and vinyl acetate can also be employed. The resulting cement composition has increased resistance to acids and alkalies although the choice of suitable solvents is more restricted. Ketones and esters are suitable solvents and 5–50% by weight of the copolymer formed satisfactory compositions.

Vinyl acetals may also be employed using alcohols as the solvent.

Various thermoplastic derivatives of cellulose are also usable. Ethyl cellulose is effective within the range of 5–50% by weight. A wide variety of solvents and combinations of solvents can be employed, very hard surfaces being produced having high resistance to acids and alkalies.

Cellulose acetate is similar to ethyl cellulose but possesses reduced resistance to alkalies and can only be used with a few solvents, principally ketones and esters. Again, from 5–50% by weight constitutes an effective usable range.

Cellulose acetate butyrate is similar to cellulose acetate and confers increased toughness to the final cement composition.

The present invention is illustrated by the following examples:

*Example I*

To one pound of Portland cement was added 3 pounds of sand and 1 pound of methyl methacrylate shavings. The shavings were approximately ¼ to ½ inch long by 1/16 to ⅛ inch wide by 1/64 inch thick. These ingredients were intimately mixed to obtain uniform admixture. To this mixture was added 1 pound of toluene-acetone mixture (3 parts toluene to 1 part acetone) and worked until a trowelable mass was obtained. This trowelable mass dried hard in two hours and when moistened with water set in twenty-four hours.

*Example II*

One part of cement was mixed with two parts of sand to produce a cement sand mixture. To 10 pounds of this mixture was added 24 ounces of green scrap polystyrene hammer-milled to pass through a 20 mesh screen. This mixture was wetted to a uniform consistency with two pounds of toluene. Samples of the mixture dried in from four to six hours. These dried samples when moistened with water set in from twenty-four to thirty hours.

The compositions of the present invention may be colored in various ways. Many thermoplastic materials are obtainable in colored form and may be used to impart color to the cement composition. The introduction of small amounts (1–5% by weight of the total composition) of inorganic pigments or of colored oxides produce colored cements without substantially effecting the properties of the resultant cement composition. Among the pigments successfully employed were various grades of iron oxide (yellow to deep reddish brown), cadmium sulphide and selenide (bright yellows through crimson), titanium dioxide (white), zinc oxide (white), chrome yellow, chrome green, chrome orange, molybdate orange, carbon black, Prussion blue, ultra marine blue and various other types of inorganic clays or fillers.

As previously described, the dried troweled composition is moistened with water to cause hydration of the cement particles in the composition. This operation may be performed by incorporating hygroscopic chemical compounds such as certain metal chlorides, e. g., calcium chloride, magnesium chloride or the like in the composition in powder form. The amount of hygroscopic salts so employed may be varied widely. Their main purpose is to provide sufficient water to cause hydration of the cement particles in the composition and, hence, it is only necessary to add a sufficient amount of these hygroscopic particles to provide the necessary quantity of water.

I claim:

1. A trowelable slurry containing in intimate admixture a synthetic film-forming thermoplastic material, a finely divided aluminous cement, an inert filler and an organic solvent comprising a mixture of acetone and toluene.

2. A process of filling cracks and pits in concrete floors which comprises applying a trowelable slurry containing in intimate admixture a synthetic film-forming thermoplastic material, a finely divided aluminous cement, an inert filler and an organic solvent comprising acetone and toluene, vaporizing the organic solvent, moistening the dried slurry with water and vaporizing the water.

References Cited in the file of this patent
UNITED STATES PATENTS

| | | |
|---|---|---|
| 1,513,382 | Fischer | Oct. 28, 1924 |
| 1,991,007 | Bonney et al. | Feb. 12, 1935 |
| 2,104,059 | Snelling | Jan. 4, 1938 |
| 2,221,431 | Omansky | Nov. 12, 1940 |
| 2,600,018 | Nelson et al. | June 10, 1952 |